US005737920A

United States Patent [19]

Able

[11] Patent Number: 5,737,920

[45] Date of Patent: Apr. 14, 1998

[54] MEANS FOR IMPROVING THE PREVENTION OF ICING IN AIR MOTORS

[75] Inventor: Stephen D. Able, Bryan, Ohio

[73] Assignee: Ingersoll-Rand Company, Woodcliff Lake, N.J.

[21] Appl. No.: 735,375

[22] Filed: Oct. 21, 1996

Related U.S. Application Data

[63] Continuation-in-part of Ser. No. 425,170, Apr. 20, 1995.

[51] Int. Cl.$^6$ .................... F16D 31/02

[52] U.S. Cl. .................... 60/407; 91/52; 92/82

[58] Field of Search .................... 60/407; 91/52; 92/1, 82

[56] References Cited

U.S. PATENT DOCUMENTS

| | | | |
|---|---|---|---|
| 3,082,596 | 3/1963 | McGay et al. | 91/52 |
| 3,534,553 | 10/1970 | Norton et al. | 60/407 |
| 3,699,717 | 10/1972 | Hedrick | 60/407 |
| 4,041,598 | 8/1977 | D'Angelo et al. | 91/52 |

*Primary Examiner*—F. Daniel Lopez
*Attorney, Agent, or Firm*—Walter C. Vliet

[57] ABSTRACT

A defined exhuast restriction in the form of an orifice or variable valve is provided to back-pressure the pulsating exhaust of an air motor or the like to reduce the formation of ice in the exhaust system.

6 Claims, 1 Drawing Sheet

MEANS FOR IMPROVING THE PREVENTION OF ICING IN AIR MOTORS

This application is a continuation-in part of application Ser. No. 08/425,170, filed Apr. 20, 1995.

BACKGROUND OF THE INVENTION

This invention relates generally to air motors and more particularly to a means for improving the prevention of icing in air motor exhausts. Air motors in general have three basic parts including one or more air cylinders or expansion chambers, air valves (at least one) to distribute air to the cylinder or chamber and to exhaust air from the cylinder or chamber, and means to provide continuous reciprocating motion, such as a pilot rod in a diaphragm pump or piston pump, which senses the end of travel of a main pump or motor rod and causes the valves to reverse direction.

The need to include design features to inhibit icing is directly related to the continuous run use of motors and is of little concern in intermittent operation, for example, thirty (30) seconds or less of operation with extended off periods of a minute or more. It is the rapid, repeated timed discharge of exhaust at sonic velocities and substantial pressure drop which facilitate the formation of ice in air motor exhausts. Air motors will often slow down, stutter or stop due to ice formation in the motor or its exhaust during operation. In some instances elastomers in the motor can be damaged by ice formation and movement of the adjacent parts inside the motor. It is therefore desirable to minimize the formation of ice or assist in its elimination from the motor.

The foregoing illustrates limitations known to exist in present devices and methods. Thus it is apparent that it would be advantageous to provide an alternative directed to overcoming one or more of the limitations set forth above. Accordingly a suitable alternative is provided including features more fully disclosed hereinafter.

SUMMARY OF THE INVENTION

In one aspect of the present invention elimination of icing is accomplished by providing a means for the prevention of icing in air motors including a working air chamber adjacent a piston or diaphragm or the like for extracting work from an air supply, and accurate restriction means for controlling the discharge pressure from the working air chamber for controlling the air temperature exiting the exhaust of the working air chamber.

The foregoing and other aspects of the invention will become apparent from the following detailed description when considered in conjunction with the accompanying drawing figures.

BRIEF DESCRIPTION OF THE DRAWING FIGURES

FIG. 1 is a schematic of an air motor illustrating an embodiment of the present invention.

DETAILED DESCRIPTION

Figure 1:
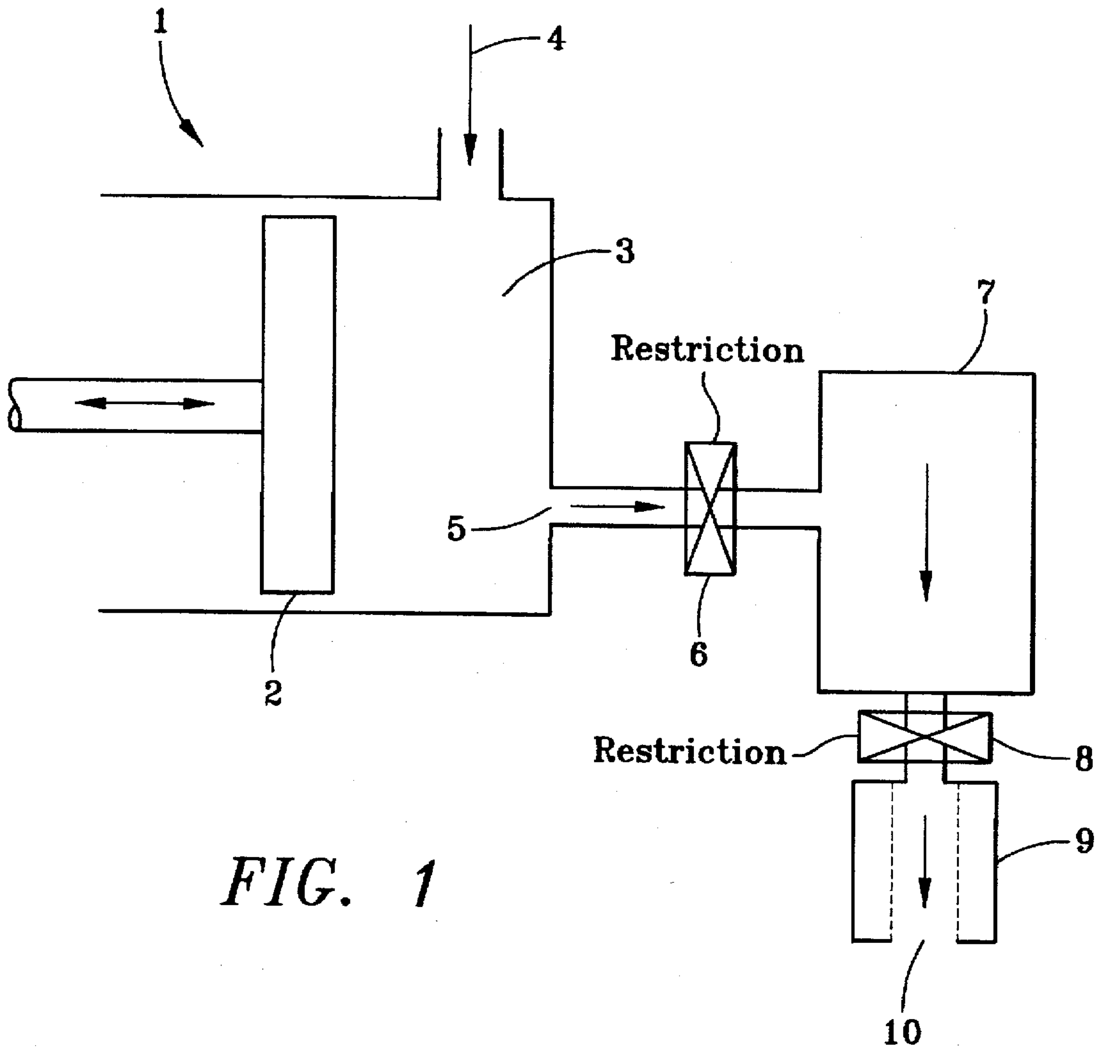

Low temperatures generated in the working air chamber (adjacent to a piston, diaphragm, or rotary air motor) typically lead to cold air being discharged through exhaust valving and/or an exhaust chamber and then is either piped away or discharged to atmosphere through a noise silencing muffler.

The temperature of the air can be maintained at a significantly warmer level by the use of a pressure control device in the exhaust system which will maintain the pressure inside the compressed air chamber. The pressure which must be maintained to avoid icing can vary with the operating conditions, but would typically be in the range of approximately 2 to 20 psig.

To accomplish this according to the present invention a typical air motor, as shown schematically in FIG. 1, may be adapted as follows:

The air motor generally designated by the reference numeral 1 may be of the piston, diaphragm, or rotary type having the volume of a working chamber 3 controlled by a piston diaphragm or vane type or the like device 2 wherein work is extracted from a pressure fluid such as air supplied at an inlet 4. Spent pressure or partially spent pressure fluid is typically exhausted through a discharge orifice 5 to an exhaust chamber 7 or a muffler 9 or combination thereof to atmosphere at an outlet 10. Due to varying inlet conditions of temperature and/or water content within the pressure fluid and the inherent restrictions in the discharge through the exhaust chamber 7 and the end or the muffler 9, the exhaust air may be considerably expanded thereby reducing its temperature below the freezing point of water thereby producing ice which may coat the exhaust chamber and/or muffler and thereby further restrict the exhaust flow area.

Heretofore such problems have often been addressed by stopping operation, for example, cold weather, drying the air supply or heating it, and/or the surrounds of the pump. According to the present invention, as indicated in FIG. 1, it has been found that the use of a pressure control device in the exhaust system, for example, a motor restriction 6, which may be specifically designed or of a variable design as, for example, a control valve, may be utilized to increase the temperature of the working air chamber 3 by back-pressuring it in the range of 2 to 20 psi or by placing a similar specifically designed restriction or variable exhaust chamber restriction 8 at the outlet of the exhaust chamber 7 or muffler 9.

Use of the variable restriction permits the greater efficiency possible with unrestricted exhaust where icing is not a problem while maintaining the capability of preventing ice formation by selective restriction in the exhaust where the formation of ice is an operating problem.

Having described my invention in terms of a preferred embodiment, I do not wish to be limited in the scope of my invention except as claimed.

What is claimed is:

1. An air motor including:

a working air chamber adjacent a reciprocating piston or diaphragm or the like for continuously extracting work from an air supply at a rate sufficient to form ice in expanded air exhausting said working air chamber, said working air chamber including an inlet for receiving compressed air and an exhaust port including a passage to exhaust said air supply; and a means for prevention of exhaust flow icing comprising: restriction means in said passage to exhaust for accurately controlling the discharge pressure and air flow from said working air chamber for controlling the air temperature exiting the exhaust of said working air chamber.

2. An air motor according to claim 1 wherein: said restriction means for accurately controlling the discharge pressure and air temperature comprises a fixed orifice.

3. An air motor according to claim 1 wherein: said accurate restriction means for controlling the air discharge pressure and temperature comprises a variable metering valve.

4. An air motor according to claim 1 wherein: said accurate restriction means is located between said working air chamber and an exhaust chamber following said air chamber.

5. An air motor according to claim 1 wherein: said accurate restriction means is located after an exhaust chamber following said working chamber.

6. An air motor according to claim 1 wherein: said accurate restriction means is placed between said working air chamber and a muffler.

* * * * *